April 1, 1941.  W. F. COURT  2,236,895
HYDRAULIC DISRUPTION OF SOLIDS
Filed Nov. 4, 1938  2 Sheets-Sheet 1

Inventor: William Frederick Court
By his Attorney:

Inventor: William Frederick Court
By his Attorney:

Patented Apr. 1, 1941

2,236,895

UNITED STATES PATENT OFFICE 2,236,895

HYDRAULIC DISRUPTION OF SOLIDS

William Frederick Court, Webster Groves, Mo., assignor to Shell Development Company, San Francisco, Calif., a corporation of Delaware Application November 4, 1938, Serial No. 238,848

5 Claims. (Cl. 210—44)

This invention relates to the hydraulic disruption of solid masses, such as coke, by means of water jets, and is particularly concerned with improvements in the step of clarifying the used water to permit its being recirculated to the water jets.

In my copending application Serial No. 191,685, filed February 21, 1938, of which this is a continuation-in-part, I have described particularly the process for cleaning vessels which contain carbonaceous material, such as deposits of coke produced by the carbonization of hydrocarbon oils, particularly reaction and coking chambers employed in petroleum cracking plants and the like, and asphaltic materials, especially the solid, brittle kinds, by means of water jets. In accordance with that process, the body of carbonaceous material to be removed is disrupted by jets of water, applied in several steps, the water and lumps of solids falling from the bottom of the vessel or chamber into a receptacle, such as a car. Most of the coke settles to the bottom of the car, and only a suspension of relatively fine particles of carbonaceous solid in water is washed over the side or through openings in the side or bottom of the car. The suspension is collected in a trough and led into a settling basin provided with a screen. Most of the solids are settled and filtered out of the water which is then recirculated through the pumps and jetting nozzles.

In practicing this method, it was found that the separation of the fine particles of carbonaceous solids from the water to be recirculated to the jetting operation is necessary to prevent wear and tear on the conduits, pumps, and nozzles, and prevent costly repairs and interruptions. The presence of substantial quantities of coke and similar carbonaceous matter in the water rapidly causes erosion and results in a drop in efficiency of the high pressure pumps required in this method. Wear and tear of the pump and nozzles increase the load on the driver actuating the pump and thus materially increase the cost of the operations. In some cases, the nozzle tips become plugged due to the presence of so much fine coke that the jet operation must be stopped for the purpose of cleaning nozzle tips.

Difficulty has been experienced in clarifying the water which is recirculated to the jetting operation and in treating the slurry of carbonaceous fines which is filtered or settled out in the clarification system. The treatment of the slurry is necessary for recovering the water for recirculation or the fines for utilization as a product. It often was sought to obtain as small a volume of the slurry as practical to permit its disposal without too great a loss of water. This necessitated the use of relatively large settling basins to provide a sufficient settling time and often resulted in an insufficient clarification of the recirculated water.

It is an object of this invention to provide an improved method and apparatus for separating fine particles of carbonaceous solids from water which flows off during the disruption of carbonaceous deposits by means of water jets, such as hydraulic decoking operations. It is a further object of the invention to provide a water clarification system which is simple to operate and is capable of taking care of fluctuations in the rate at which water is charged into it. Still another object is to provide an improved method and apparatus for removing carbonaceous deposits from coke chambers and the like by means of water jets in which the wear on the hydraulic equipment and the danger of stoppage due to obstruction by carbonaceous material are reduced to a minimum. Other objects of the invention will be apparent from the following specification.

It will be understood that while water is specifically referred to the invention is not limited thereto, but may be practiced with other liquids. The expression "water" is intended, therefore, to include equivalent liquids, such as oils or aqueous solutions, emulsions, etc.

In accordance with the present invention, it was found that a slurry of carbonaceous fines and water, such as is withdrawn from the chamber being cleaned or from a settling basin, can be broken readily, i. e., separated into water and coke, by flowing it through a layer of larger particles of carbonaceous material, such as the lump coke contained in one of the coke cars beneath the coke chamber. By this method, the water introduced into the settling and/or filtration units will contain smaller quantities of fines than when the suspension is treated in these units without passing through the coke bed. Further, it was found that larger bodies of slurry can be clarified, thereby making it possible to recirculate to the jetting operation a relatively higher proportion of water of improved clarity.

It will be noted that the invention involves the flow of a slurry of water and fines through a coke bed, such slurry being derived either from the chamber being cleaned, or from the settling and/or filtration units, and that it may be applied to the treatment of either type of slurry without the other, although in the preferred form of the invention, described in detail herein, both slurries are passed through the bed of coke.

The invention may be understood from the following detailed description given in connection with the accompanying drawings which are exemplary only, it being understood that the invention is not limited to these specific steps described herein nor to the use of the particular apparatus illustrated in the drawings. In the drawings.

Figure 1:
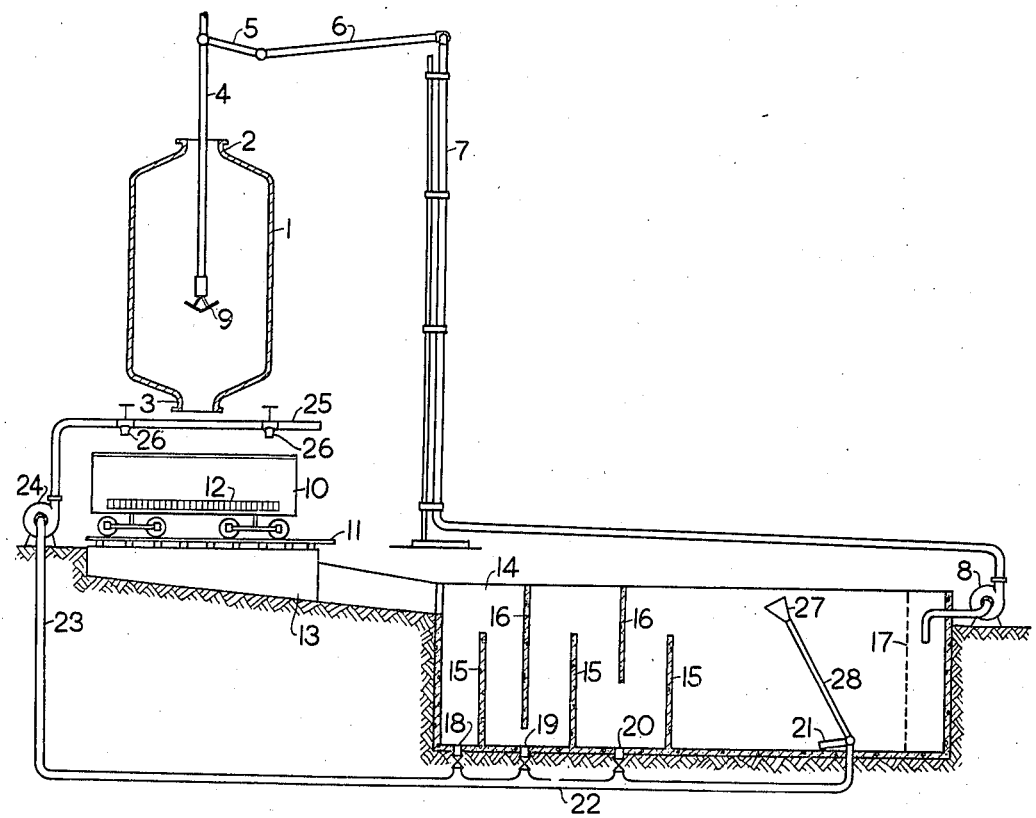
Figure 1 is a schematic diagram illustrating one form of the invention, parts being shown in elevation and sectional elevation.

Referring to Figure 1, 1 is a coke chamber of a usual cracking or coking installation, containing carbonaceous material to be removed, provided with upper and lower manhole heads 2 and 3; 4 is a vertical water feed pipe supported by a tower, not shown, and supplied with water by hinged pipes 5 and 6, riser pipe 7, and a high pressure pump 8. The water feed pipe 4 is vertically adjustable and carries jetting nozzles 9, which may be such as those described in my parent application Serial No. 191,685, for disrupting the coke in the chamber 1.

During the jetting operation the water disrupts the carbonaceous material and a mixture of water containing suspended fines and larger lumps of coke falls through the lower manhole 3 into a coke car 10 movable on tracks 11. The car 10 may be provided with openings 12 at the bottom to permit water to drain out into a trench 13; in most cases, however, the poorly fitted plates usually found in railroad dump cars provide sufficient openings for the egress of water. This water, containing suspended fines, flows into a settling tank 14 equipped with over and under baffles 15, 16. A screen 17 separates fines which do not settle out in the tank. The clarified water is recirculated to the nozzles by the pump 8.

It will be noted that the slurry of water and suspended fines which is removed from the lower manhole 3 together with the larger lumps of coke passes through the bed of coke in the car. As a consequence, the slurry is broken and the water escaping through the openings 12 contains a relatively smaller quantity of fines than would slurry which is passed into the trench 13 and settling tank 14 directly from which the lump coke has been removed without flow through a bed of coke.

In the settling tank 14 the time required for sedimentation increases as the volume of the lower suspension or slurry layer is decreased. In view of the difficulty of breaking the settled slurry it was heretofore the practice to withdraw as much as possible of the water via the pump 8. This often resulted in an incomplete settling, with the consequence that the recirculated water in the pump 8 contained unduly large quantities of fines. To achieve the improved settling required the construction of excessively large settling basins and even by this expedient it was not possible to effect the recirculation of all of the water.

In accordance with the present invention, I withdraw the settled slurry from the settling tank 14 at one or more points 18, 19, 20, and 21, via manifold 22 and conduit 23 by the action of pump 24 and discharge the slurry via conduit 25 and faucets 26 into the coke car 10. It was found that the slurry was effectively broken and that the suspension through the holes 12 into the trench 13 was of substantially the same character as that which flowed through these holes in the absence of the slurry which was recirculated via the conduit 25. By this method, it becomes possible not only to clarify the slurry and to recover the coke therefrom, but to aid the sedimentation in the settling tank 14, because it is not necessary to reduce the volume of the slurry to as small a volume as heretofore.

The slurry in the conduit 25 may be introduced into the coke car 10 either simultaneously with the water and coke discharged from the coke chamber 1, or separately into a coke car which has been filled previously with coke. As indicated heretofore, the treatment of the slurry from the settling tank may be practiced independently of the step of filtering the slurry from the coke chamber 1, it being possible to omit the latter step. Also, the bed of coke need not be in a car, but may be a deposit of coke on a suitable screen or even in a basin, arranged to permit water to drain from the bottom.

The connections between the manifold 22 and the settling tank are provided preferably with valves, so that the slurry can be removed intermittently, as when the slurry has accumulated in the tank to a height which will interfere with the proper operation of the tank. It was found that the slurry can be readily pumped but it is very desirable to maintain a sufficiently high flow velocity in the conduits to avoid the deposition of coke therein.

The settling tank 14 is provided further preferably with one or more skimmers 27 connected to the manifold 22 by a conduit 28 for the purpose of removing small particles of coke which float on the surface of the water. In installations wherein floating coke is not encountered the skimmer 27 may be eliminated. The skimmer 27 is normally kept in operation continuously during the operation of the settling tank. Air agitating coils, like coils 73 described in Figure 2, may also be provided.

Figure 3:
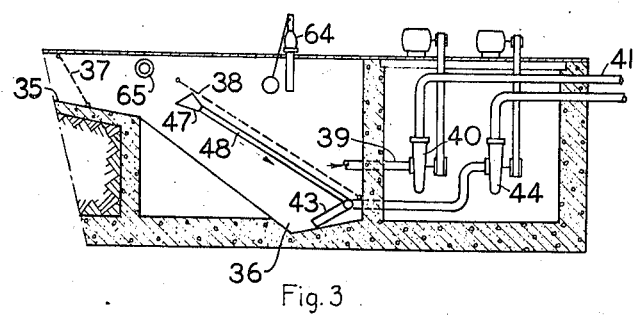
Figure 3 is a vertical sectional view of the preliminary settling and screening unit of Figure 2.
Figure 2:
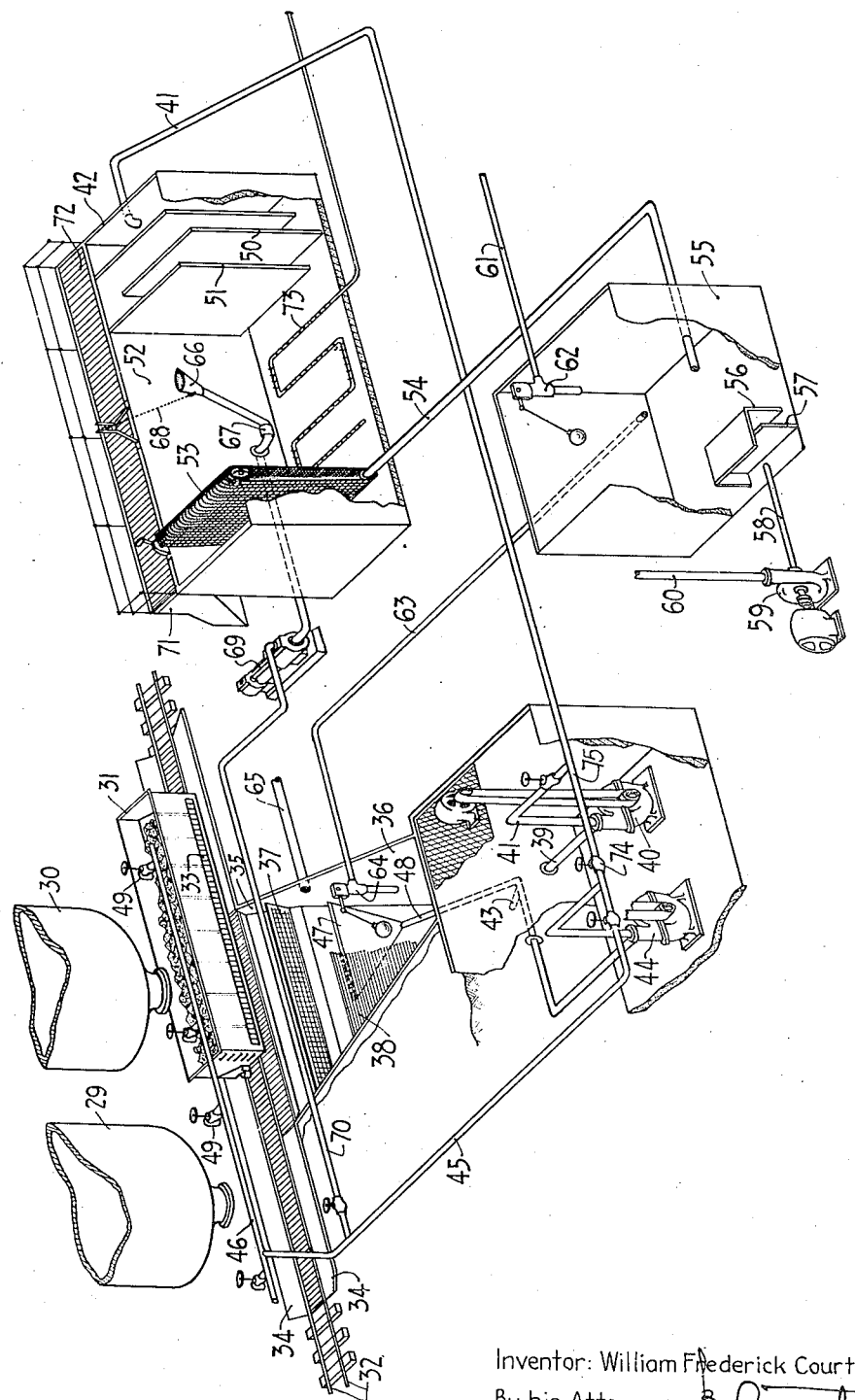
Figure 2 is a perspective view of a preferred water-clarifying equipment according to another form of the invention.

In the preferred clarification system according to the invention the suspension removed from the coke chambers is clarified in several stages. This embodiment is described in connection with Figures 2 and 3. Referring to Figure 2, 29 and 30 are coke chambers provided with manholes and supported by a pedestal, not shown. They are provided with a water feed pipe and jetting nozzles as described in connection with Figure 1. A coke car 31 movable beneath the manholes or tracks 32 is provided with openings 33 at the bottom to permit a suspension of coke and water to drain therefrom. The suspension flowing through the opening 33 and over the sides of the car is collected by concrete aprons 34 and directed into a trough beneath the tracks. The suspension flows by gravity from the trough into a lateral trench 35 and into a preliminary settling and screening basin 36, shown more particularly in Figure 3. The water passes first through a coarse screen 37 such as a screen provided with openings one inch square to exclude coarse particles of coke, and then through a finer inclined screen 38, such as a screen provided with 150 to 200 openings per square, such both screens extending entirely across the basin 36. Part of the suspended coke is removed by settling in the basin 36 or by filtration by means of the screen 38 and the partially clarified water is withdrawn by a conduit 39, clear water pump 40, and conduit 41 and is introduced into a settling tank 42.

The settled slurry of coke is withdrawn from the bottom of the basin 36 through an intake pipe 43 and flows through slurry pump 44 and conduit 45 to the manifold 46, located parallel to the tracks 32. A skimmer 47 extending at its upper end across the entire width of the settling basin is also connected to the slurry pump 44 by means of a conduit 48. Fine particles of coke which float on the surface of the water are thereby removed to prevent accumulation of such bodies near the top of the screen 38.

A plurality of faucets 49 is provided on the manifold 46 located to discharge the slurry into the coke car 31. In an installation comprising a plurality of coke chambers, the coke car may assume a position beneath any one chamber being cleaned or may stand idle over any portion of the trough after it has received a bed of coke, and the faucets 49 are located so that the water from the manifold 46 may be discharged into the coke car in any one of its several positions, the faucets being preferably arranged so as to discharge the slurry at several points in the coke car, as shown.

The settling tank 42 is provided with over and under baffles 50, 51 and with a final settling chamber 52. The partially clarified water introduced by conduit 41 is further clarified in tank 42 and flowed through a roller-type screen 53, preferably of relatively fine mesh. After passing through the screen, the water enters a slotted intake pipe 54 and flows into a surge tank 55.

Further settling may take place in the surge tank and the clarified water flows beneath and over the final under and over baffles 56, 57, and is discharged from the surge tank via conduit 58 and high pressure pump 59. Water from the pump 59 is flowed through a high pressure riser pipe 60 to the jetting nozzles in the coke chamber being cleaned, as indicated in Figure 1. Fresh water make up is introduced into the surge tank 55 via conduit 61, provided with a float-controlled valve 62 to maintain the level in the surge tank substantially constant.

It is desirable to keep the water level in the preliminary settling basin 36 substantially constant to prevent the pumps from running dry. This is effected by withdrawing water from the bottom of the surge tank 55 via a conduit 63 and float-controlled valve 64. An overflow line 65 is also provided. By connecting the conduit 63 to the bottom of surge tank the relatively dilute slurry which sometimes settles therein is discharged from the bottom of the surge tank.

A skimmer 66 is mounted by means of a swivel joint 67 and a chain 68 in the final settling chamber 52 to trap particles of floating coke and minimize the clogging of the screen. Water drawn in by the skimmer is conducted by a slurry pump 69 and conduit 70 to the manifold 46, and is disposed of in the same manner as the slurry from the preliminary settling basin 36. A trough 71 is attached to one side of the settling tank 42, covered by a grating 72. When the accumulation of fine coke on the bottom of the tank between the baffles is sufficient to require cleaning, the settling tank is emptied and the coke is manually removed and dumped into the trough from where it falls into a truck or similar conveyance.

An agitating coil 73 is located at the bottom of the chamber 52. When the accumulation of coke at the bottom of the settling chamber is so great as to interfere with the smooth functioning of the settling tank, a blast of air is emitted from the coil, thereby raising the coke to the surface of the water and permitting its withdrawal through the skimmer 66. If desired, a similar skimmer and similar agitating coils may be provided between adjacent baffles 50, 51, thereby obviating the use of the trough 71.

Moreover, slurry may be withdrawn from the bottom of the settling tank at one or more points in the manner shown in Figure 1.

A by-pass line 75, provided with a valve 74, joins the clear water conduit 41 with the slurry conduit 45, permitting the liquids to be diverted when a part of the system is shut down, or when a part of the system is too full.

The method of operation will be apparent from the above description of the two forms of the water clarification system. It will be understood that when there is a series of coke chambers certain chambers will be in operation for reacting products withdrawn from the cracking furnace, while usually not more than one is being cleaned at one time. This cleaning operation, described more completely in my parent application, is usually conducted in several steps, and the rate of flow of water from the lower manholes is interrupted, so that the surge tank should be of sufficient size to maintain the water level in the preliminary settling basin 36 and to provide a sufficient volume of water for the jetting operation.

With regard to the skimmer 47 and the lower intake pipe 43, it may be stated that, while valves may be provided to proportion the relative intakes into the slurry pump 44, no regulation is normally required, it having been found practical to obtain a proper balance between the settled slurry and the surface slurry by a proper design of the relative cross-sectional areas and lengths of the pipes 43 and 48.

The expression "slurry" is, in the present specification and claims, intended to include settled slurry and surface slurry, i. e., the material withdrawn from the bottom and the material withdrawn from the surface of the water in a settling basin, as well as the suspension removed from the coke chamber. While the method is particularly adapted for use in connection with the high pressure hydraulic removal of coke from vertical reaction chambers of the type used in a Dubbs cracking installation, it may also be used when other bodies of carbonaceous solids are hydraulically disrupted.

I claim as my invention:

1. A process for clarifying a slurry of liquid containing suspended fines, produced by disrupting a body of solid material in a container into pieces by means of a water jet, comprising the steps of accumulating disrupted solids in a bed, flowing said slurry through a sedimentation zone, withdrawing liquid substantially freed from suspended fines from said zone, withdrawing a concentrated slurry of fines from said zone, and flowing said concentrated slurry through said bed.

2. The process according to claim 1 in which a concentrated slurry of settled fines is withdrawn from the bottom of the settling zone, a concentrated slurry of surface fines is withdrawn from the surface of the liquid in the settling zone, and both slurries are flowed through said bed.

3. Apparatus for clarifying a slurry of liquid containing suspended fines produced by disrupting a body of solid material in a container into pieces by means of a water jet, comprising a receptacle adapted to contain a bed of said disrupted solids, a settling basin, means for conducting a slurry from said receptacle to said basin, means for withdrawing clarified liquid from the settling basin, means for withdrawing slurry from said basin, and means for conducting said withdrawn slurry to said receptacle and discharging it on the bed of solids therein.

4. Apparatus for clarifying a slurry of liquid containing suspended fines produced by disrupting a body of solid material in a container into pieces by means of a water jet, comprising a receptacle adapted to contain a body of said disrupted solids, a settling basin, means for conducting a slurry from said receptacle to said basin, means for withdrawing clarified liquid from the settling basin, nozzle means near the bottom of said basin for emitting a blast of a gas, a skimmer arranged to withdraw surface slurry from surface of the liquid in said basin, and means for conducting said withdrawn slurry to said receptacle and discharging it on the bed of solids therein.

5. A process for clarifying a slurry of liquid containing suspended fines, produced by disrupting a body of solid materials in a container into pieces by means of a liquid jet, comprising the steps of accumulating disrupted solids in a bed, flowing said slurry through a sedimentation zone, withdrawing liquid substantially freed from suspended fines from said zone, withdrawing a concentrated slurry of fines from said zone and flowing said concentrated slurry through said bed.

WILLIAM FREDERICK COURT.